(12) United States Patent
Iversen

(10) Patent No.: US 8,806,322 B2
(45) Date of Patent: Aug. 12, 2014

(54) SYSTEM AND METHOD FOR OBTAINING A STRUCTURED ADDRESS BY GEOCODING UNSTRUCTURED ADDRESS INFORMATION

(75) Inventor: Grim Hegland Iversen, Manly (AU)

(73) Assignee: Google Inc., Mountain View, CA (US)

( * ) Notice: Subject to any disclaimer, the term of this patent is extended or adjusted under 35 U.S.C. 154(b) by 191 days.

(21) Appl. No.: 13/305,690

(22) Filed: Nov. 28, 2011

(65) Prior Publication Data

US 2013/0139044 A1    May 30, 2013

(51) Int. Cl.
*G06F 17/00* (2006.01)
(52) U.S. Cl.
USPC ............................................ 715/225; 715/226
(58) Field of Classification Search
USPC .................. 715/221, 224, 225, 226
See application file for complete search history.

(56) References Cited

U.S. PATENT DOCUMENTS

| | | | |
|---|---|---|---|
| 6,981,001 B1* | 12/2005 | Reddick et al. | 1/1 |
| 8,010,622 B2* | 8/2011 | Dolan | 709/217 |
| 8,560,934 B1* | 10/2013 | Reddick et al. | 715/224 |
| 8,612,147 B2* | 12/2013 | Som | 701/520 |
| 8,626,789 B2* | 1/2014 | Jayanti et al. | 707/771 |
| 2002/0194379 A1* | 12/2002 | Bennett et al. | 709/246 |
| 2006/0282442 A1* | 12/2006 | Lennon et al. | 707/100 |
| 2008/0195629 A1 | 8/2008 | Kim et al. | |
| 2008/0233956 A1 | 9/2008 | Wyk et al. | |
| 2008/0256128 A1* | 10/2008 | Pierce et al. | 707/104.1 |
| 2008/0301092 A1 | 12/2008 | Jayanti et al. | |
| 2009/0177678 A1 | 7/2009 | Clark et al. | |
| 2010/0182341 A1* | 7/2010 | Lee et al. | 345/635 |
| 2010/0184401 A1* | 7/2010 | Spence | 455/404.2 |
| 2010/0229190 A1* | 9/2010 | Koo et al. | 725/14 |
| 2011/0035328 A1* | 2/2011 | Nielsen et al. | 705/342 |
| 2011/0082808 A1* | 4/2011 | Beykpour et al. | 705/327 |
| 2012/0053759 A1* | 3/2012 | Lowrey et al. | 701/2 |
| 2012/0144285 A1* | 6/2012 | Bach et al. | 715/221 |
| 2012/0173358 A1* | 7/2012 | Soroca et al. | 705/26.3 |
| 2012/0254804 A1* | 10/2012 | Sheha et al. | 715/834 |
| 2012/0317202 A1* | 12/2012 | Lewis | 709/204 |
| 2013/0104035 A1* | 4/2013 | Wagner et al. | 715/240 |
| 2014/0074871 A1* | 3/2014 | NGO et al. | 707/758 |

OTHER PUBLICATIONS

Lewis et al.,Gecoding Addresses, Chapter 4, Springer 2007, pp. 69-96.*
McCallum, Interactive Information Extraction with Constrained Conditional Random Fields, Google 2004, pp. 1-8.*
Viola et al., Learning to Extract Information from Semi-structured Text using a Discriminative Context Free Grammar, ACM 2005, pp. 330-337.*

* cited by examiner

*Primary Examiner* — Cong-Lac Huynh
(74) *Attorney, Agent, or Firm* — McDermott Will & Emery LLP

(57) ABSTRACT

A system and machine-implemented method for populating an electronic form is provided. A command for pasting a string of unstructured data into one of several fields of a structured address form is detected. The string of unstructured data is geocoded to obtain a geolocation. The geolocation is reverse-geocoded to obtain structured address data. Each of the several fields of the structured address form is populated with a corresponding field from the structured address data.

14 Claims, 7 Drawing Sheets

500

Unstructured Listing:
1600 Pennsylvania Ave NW D.C. — 502

Geocoder — 504

Latitude: 38° 53' 52" north
Logitude: 77° 02' 13" west — 506

Reverse Geocoder — 508

Structured Listing:
Entry Name: White House
Address1: 1600 Pennsylvania Avenue NW
Address2:
City: Washington
State: District of Columbia
Zip code: 20500 — 510

SYSTEM AND METHOD FOR OBTAINING A STRUCTURED ADDRESS BY GEOCODING UNSTRUCTURED ADDRESS INFORMATION

BACKGROUND

The present disclosure generally relates to obtaining a structured address form from unstructured address information to populate an electronic form.

Web-based forms commonly require users to enter information in a structured format. For example, a structured address form may include a street field, a city field, a state field, and a zip code field. In order to fill out a structured address form, a user must navigate from one field to a next field in order to enter data in each field. Navigating between the fields and entering data into each field separately may be time consuming. Thus, it may be desirable to implement a system that receives an unstructured string of data and outputs data in a structured format in order to populate a structured form.

SUMMARY

The disclosed subject matter relates to a machine-implemented method of populating an electronic form. A paste command to paste a string of unstructured data into one of several fields of a structured address form is detected. The string of unstructured data is geocoded to obtain a geolocation. Structured address data is obtained by reverse-geocoding the geolocation. Each of the several fields of the structured address form is populated with a corresponding field from the structured address data.

The disclosed subject matter also relates to a machine-readable medium comprising instructions stored therein, which when executed by a system, cause the system to perform operations comprising populating an electronic form. A structured address form is identified based on labels associated with each of several input fields of a web form. A paste command is received to paste unstructured data from a clipboard into one of the several input fields of the web form. A structured address is obtained from the unstructured data by sending the unstructured data to a geocoder/reverse-geocoder pair. The geocoder converts the unstructured data into a geolocation and the reverse-geocoder converts the geolocation into a structured address. Each of the several input fields of the web form is populated with data from a field of the structured address corresponding to a label associated with each input field.

According to various aspects of the subject technology, a system comprising one or more processors and a machine-readable medium comprising instructions stored therein, which when executed by a system, cause the system to perform operations comprising populating an electronic form, is provided. Unstructured data is received from a client device. The unstructured data corresponds to data being pasted from a clipboard of the client device into one of several input fields of a structured address form identified by the client device based on labels associated with each of a plurality of input fields of the structured address form. The unstructured data received from the client device is parsed based on a set of heuristics to produce structured address data corresponding to the unstructured data. The structured address data is returned to the client device, where the structured address data is used to populate each of the plurality of input fields of the structured address form.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
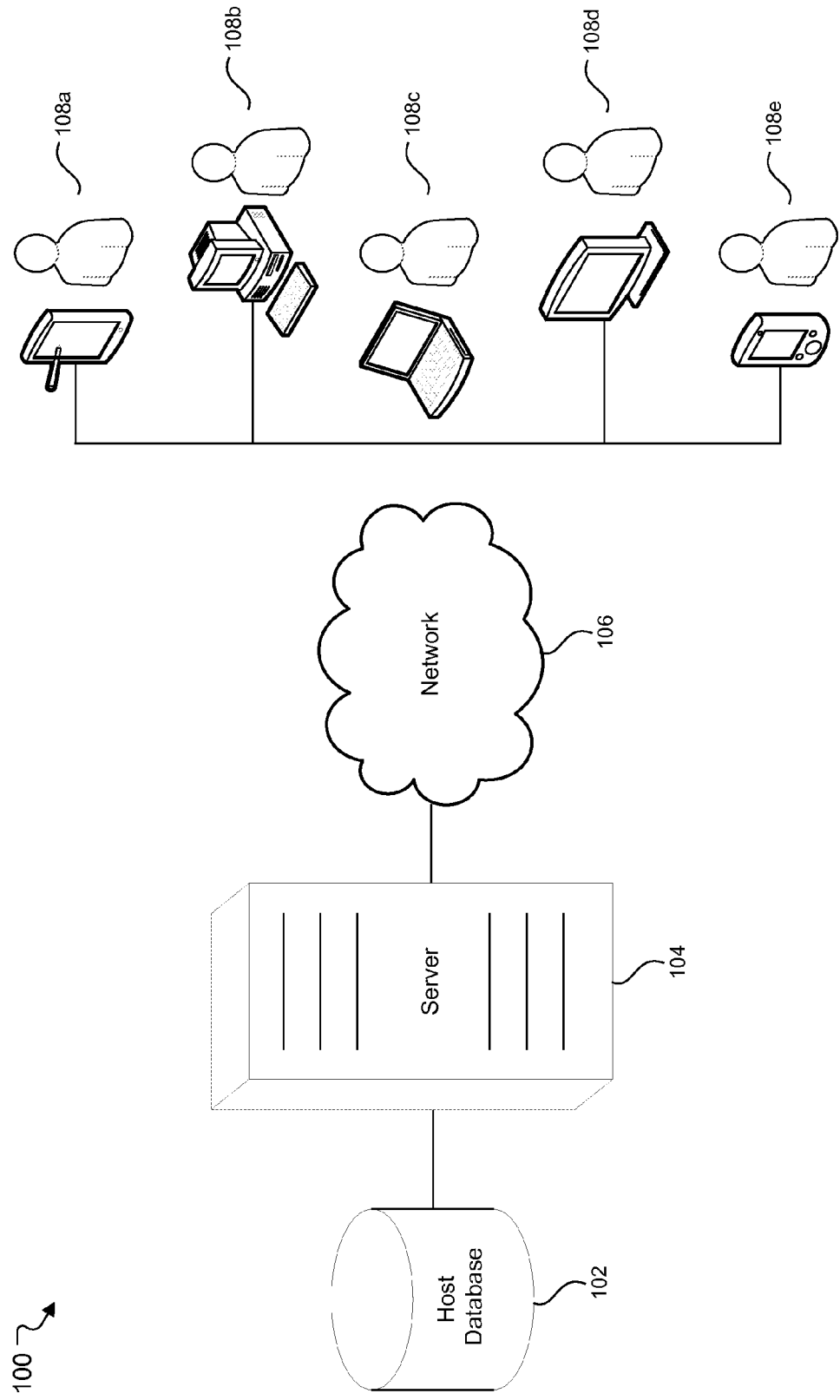
FIG. 1 illustrates an example network environment which provides for populating an electronic form.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter relates to a machine-implemented method of populating an electronic form. A paste command to paste a string of unstructured data into one of several fields of a structured address form is detected. The string of unstructured data is geocoded to obtain a geolocation. Structured address data is obtained by reverse-geocoding the geolocation. Each of the several fields of the structured address form is populated with a corresponding field from the structured address data.

When a client device detects a user paste command, a string of unstructured data being pasted from a clipboard is geocoded to obtain a geolocation (e.g., longitude and latitude coordinates). The geolocation is reverse-geocoded to produce structured address data, which is use to populate each corresponding field of the several fields of the structured address form.

Network environment 100 comprises one or more databases 102 (e.g., computer-readable storage devices) for storing a variety of data accessed by web-based forms. The network environment 100 further comprises one or more servers 104. Server 104 may receive requests from user-operated client devices 108a-108e. Server 104 and client devices 108a-108e may be communicatively coupled through a network 106. In some implementations, client devices 108a-108e may request data from server 104. Upon receiving the request, server 104 may retrieve a set of data from database 102 and serve the set of information to client devices 108a-108e.

Each of client devices 108a-108e can represent various forms of processing devices. Example processing devices can include a desktop computer, a laptop computer, a handheld computer, a television with one or more processors attached or coupled thereto, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
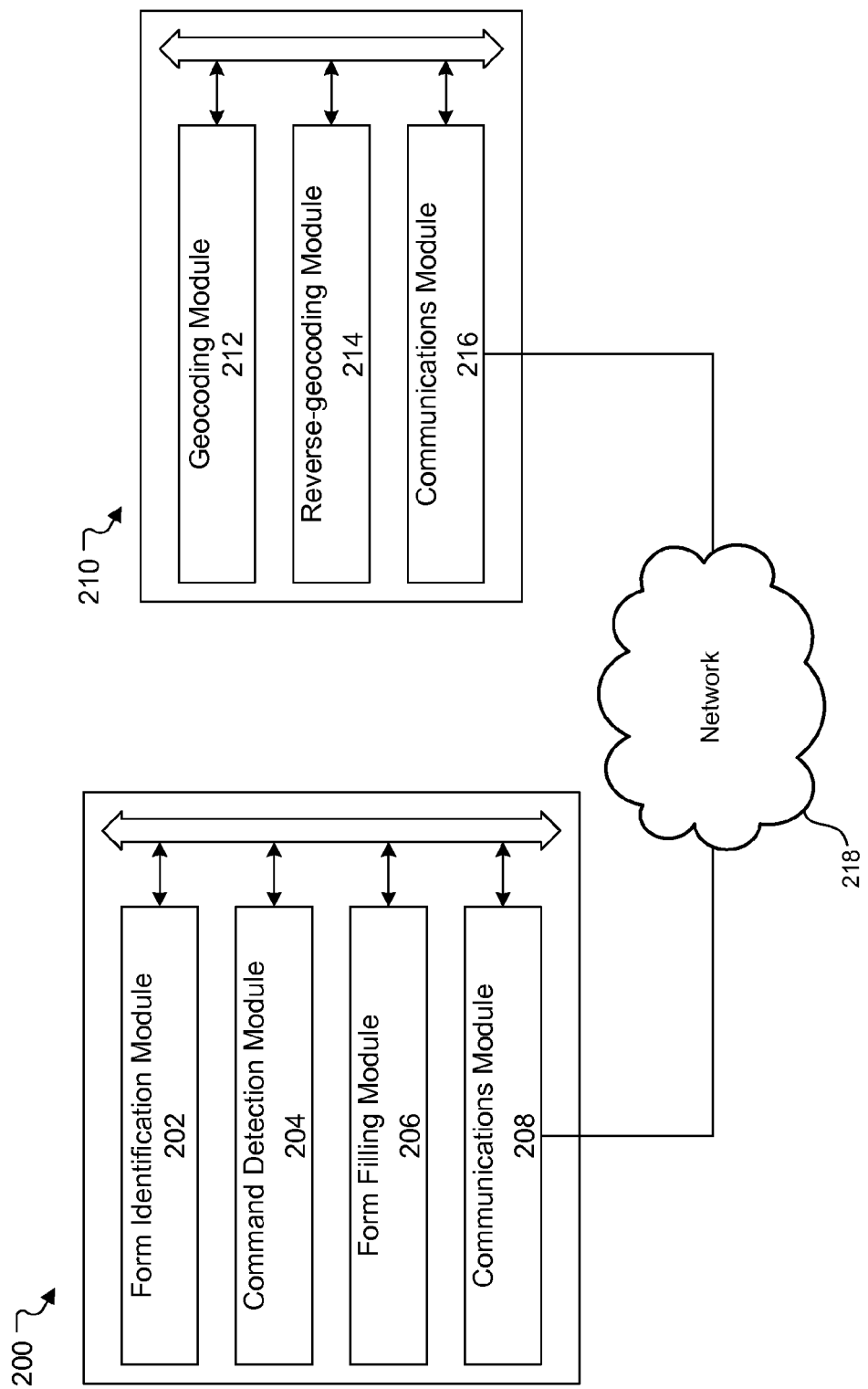
FIG. 2 illustrates an example of a client device system and a server system for populating an electronic form.

FIG. 2 illustrates an example of a client device system and a server system for populating an electronic form. Client device system 200 includes form detection module 202, command detection module 204, and form filling module 206, and communications module 208. These modules, which are in communication with one another, may identify an electronic form including fields for structured data, and may populate each of the fields of the electronic form upon detecting a user paste command. For example, an address form may be identified by form identification module 202 based on the names or labels associated with fields included in the form. Command detection module 204 may detect a user command to paste a string of unstructured data into one of several fields of the form. The string of unstructured data is sent to the server system 210 where it can be geocoded by geocoding module 212 to obtain a geolocation. The geolocation can be reverse-geocoded by reverse-geocoder 214 to obtain structured address data corresponding to the string of unstructured data. The structured address data can be sent back to client device 200. Form filling module 206 may populate each of the several fields of the form with a corresponding field from the structured address data. Client device system 200 and server system 210 may communicate via respective communications modules 208 and 216.

In some aspects, the modules may be implemented in software (e.g., subroutines and code). The software implementation of the modules may operate on web browsers running on client devices 108a-108e. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
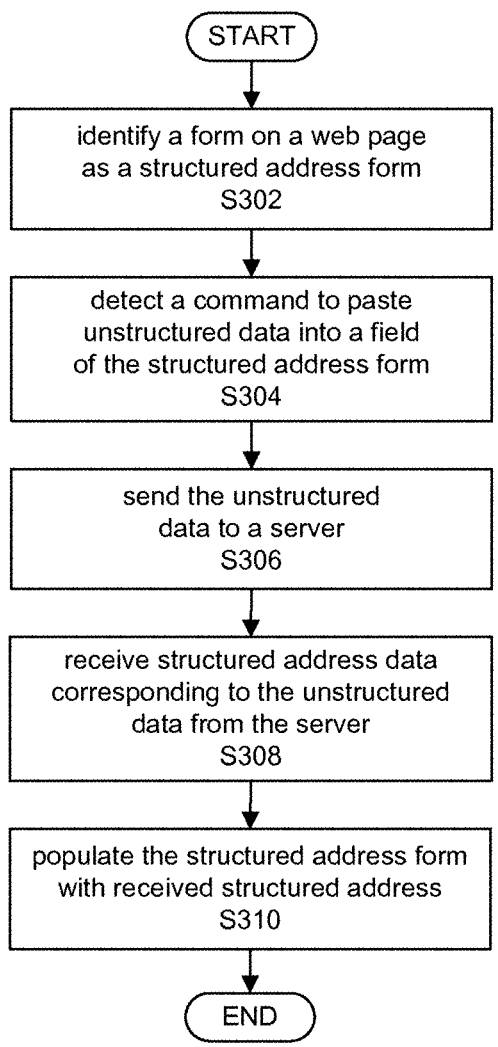
FIG. 3 illustrates an example method for receiving an unstructured string of data, outputting data in a structured format, and populating an electronic form.

FIG. 3 illustrates example method 300 for populating an electronic form. A form on a web page is identified as a structured address form, according to S302. In some implementations, an address form may be identified based on the names or labels associated with fields (e.g., street, unit number, city, state, zip code, country, etc.) provided in the form. A command to paste unstructured data into one of the several fields of the structured address form may be detected, according to S304. The paste command may be detected as a combination of keystrokes (i.e., a Ctrl-v command) or a selection of a drop-down menu item by a pointer device (e.g., a mouse, a trackball, a touchscreen), and may be detected by the operating system and treated as an interrupt as is known in the art. In some implementations, a command to copy unstructured data onto a clipboard may be detected. Similarly, the copy command may be detected as a combination of keystrokes (i.e., a Ctrl-c command) or a selection of a drop-down menu item by a pointer device.

The unstructured data is sent to a server, according to S306. The unstructured data may include data copied to a clipboard on the client device. The server may convert the unstructured address data to structured address data, and the structured address data may be received from the server, according to S308. Each of the components of the structured address data may represent a segment parsed from the unstructured data. For example, the unstructured data may include a string of text that represents address information. The structured address data corresponding to the unstructured string may include components such as a street field, a city field, a state field, a zip code field, and a country field. The received structured address data including the components is utilized to populate each field of the structured address form, according to S310.

Figure 4:
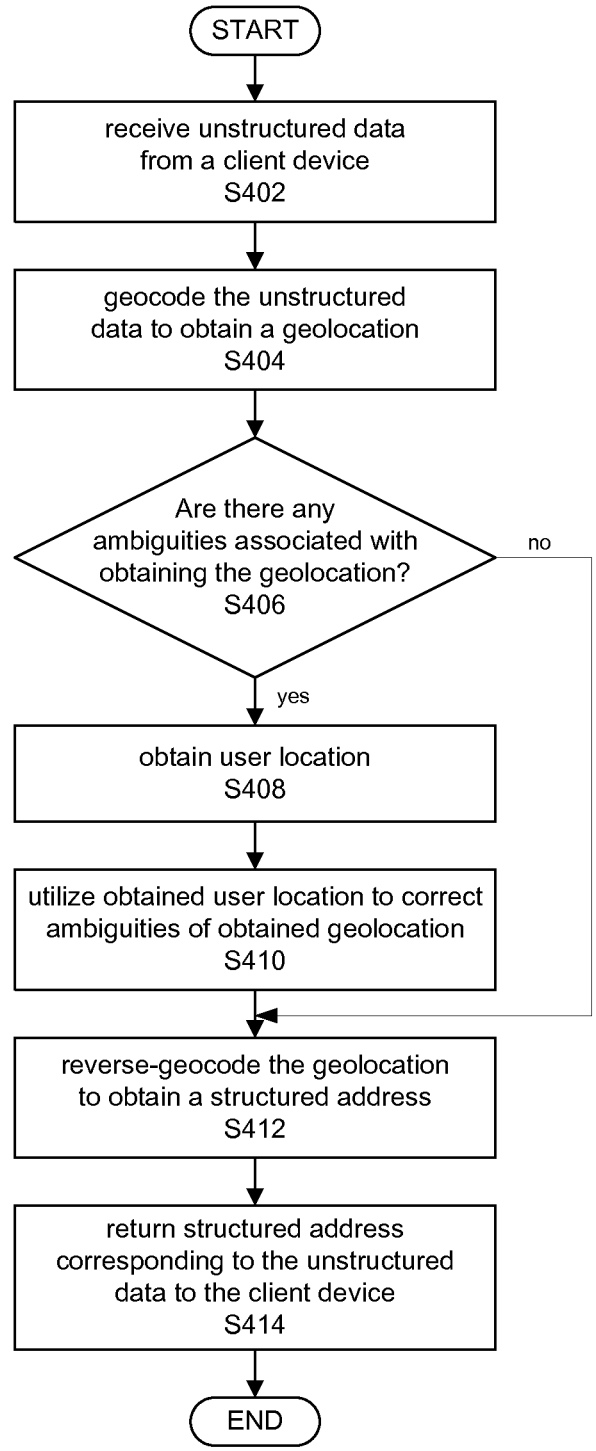
FIG. 4 illustrates an example method for geocoding an unstructured string of data to obtain a geolocation, and reverse-geocoding the geolocation to obtain data in a structured format.

In some implementations, as described above, the unstructured data is sent to a server for processing. In other implementations, the unstructured data can be converted to structured address data on the client device. FIG. 4 illustrates a method 400 for receiving unstructured data from a client device and returning structured address data corresponding to the unstructured data to the client device. Unstructured data is received from a client device, according to S402. The unstructured data is geocoded to obtain a geolocation (i.e., longitude and latitude coordinates) corresponding to the unstructured data, according to S404. For example, the unstructured string "1600 Pennsylvania Ave. NW, Washington D.C.," which is the address for the White House, is geocoded to longitude and latitude coordinates of 38° 53' north and 77° 02' west.

For some strings of unstructured data, geocoding module 212 may not be able to provide a unique or unambiguous geolocation. For example, an ambiguity may arise when the unstructured data consists of a common street name (e.g., Main St.) that is not accompanied by a city and/or state. In this example, multiple geolocations corresponding to the common street name may exist. An ambiguity associated with geolocating the unstructured data is detected, according to S406. In order to resolve the ambiguity, a user location may be obtained, according to S408. The user location is used to resolve the geolocation ambiguity, according to S410. For example, the user location may provide context to incomplete unstructured address data. Returning to the example of an address of a common street name without city or state information, the user location may indicate the city and state in which the user is located. This information can be obtained in a variety of ways. For example, it can be obtained from GPS information obtained from the client device, or from information indicating the wifi access point to which the client device is connected, or from information about the cell tower to which the client device is connected, or from location information obtained from the IP address assigned to the client device. The user location data may be sufficient to eliminate all but one of the ambiguously determined geolocations as being inconsistent with the received user location, and thereby resolve the ambiguous geolocation of the unstructured data.

Once a unique geolocation is obtained, it is reverse-geocoded to obtain a structured address, according to S412. Each geolocation may have a corresponding structured address that may be retrieved from a database. Utilizing the example described above, a geolocation with the coordinates of 38° 53' north and 77° 02' west corresponds to the White House. The White House is further associated with a structured address with the following fields:

Entry Name: White House
Street: 1600 Pennsylvania Ave. NW
City: Washington
State: District of Columbia
Zip Code: 20500
Country: United States of America A structured address corresponding to the unstructured data is returned to the client device, according to S414. The returned structured address is utilized to populate each field of the structured address form, as discussed by reference to method 300 above. In some implementations, the structured address form is presented to the user for further editing.

Figure 5:
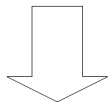
FIG. 5 illustrates an example of geocoding and reverse-geocoding a location to obtain data in a structured format.
Figure 5:
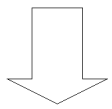
Figure 5:
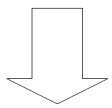
Figure 5:
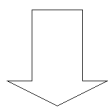

FIG. 5 illustrates an example of the geocoding steps. Unstructured listing 502 may include an unstructured address. In this example, 1600 Pennsylvania Avenue NW, Washington D.C. is used. Unstructured listing 502 is presented to geocoder 504. Geocoder 504 converts unstructured listing 502 into geolocation coordinates. For example, the address in unstructured listing 502 is converted into coordinates of 38° 53' 52" north latitude and 77° 02' 13" west longitude. Once the coordinates of the unstructured listing is determined, reverse-geocoder 508 may reverse-geocode the coordinates to a structured address. In this example, the coordinates determined from unstructured listing 502 corresponds to structured listing 510, which includes the following information: Entry Name: White House; Street: 1600 Pennsylvania Ave. NW; City: Washington; State: District of Columbia; Zip Code: 20500; and Country: United States of America. As discussed in detail by reference to method 300 above, the returned structured address is utilized to populate each field of a structured address form.

Figure 6:
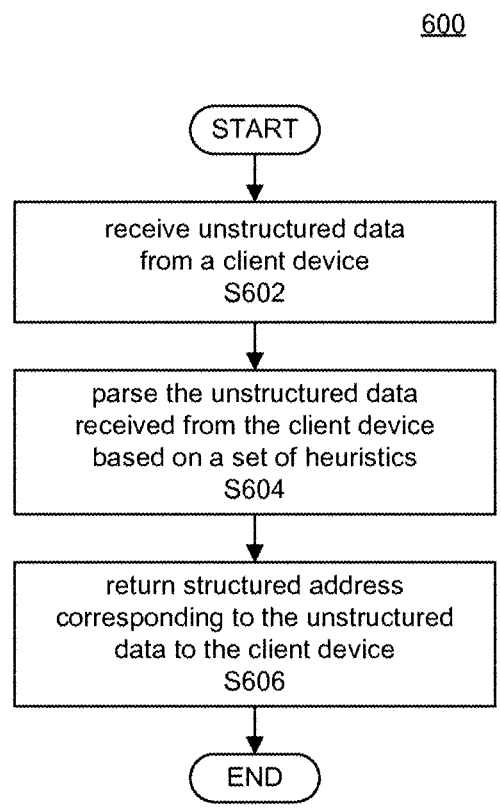
FIG. 6 illustrates an example of using heuristics to obtain data in a structured format.

In some implementations, the unstructured data sent to the server is processed by using a set of heuristics. FIG. 6 illustrates a method 600 for receiving unstructured data and returning structured address data corresponding to the unstructured data. Unstructured data is received from a client device, according to S602. The unstructured data is parsed based on a set of heuristics, according to S604. Using the example above, an address may be sent to the server as an unstructured text string of 1600 Pennsylvania Ave. NW, Washington D.C., 20500. The set of heuristics may be used to identify certain commonly used terms and/or a certain structural organization of the address data.

Commonly used terms may include labels of roads such as street, avenue, lane, court, road, etc. Utilizing the heuristic approach, terms preceding the label may provide a number and name of the street, and terms following the label may provide the city, state, and zip code of the address. Additionally, five consecutive numerical digits may be determined to be the zip code of the address. By identifying certain components of an address, the remaining components may be determined based on a general structural organization of addresses. Continuing with the example, a street number and name may be determined as the two terms preceding "Ave." Additionally, the city and state may be determined as the terms between "Ave." and the identified five digit zip code of "20500". As a result, the unstructured address may be parsed into structured data, and the resulting output generated from the set of heuristics may include the following:

Street: 1600 Pennsylvania Ave. NW
City: Washington
State: D.C.
Zip Code: 20500

A structured address corresponding to the unstructured data is returned to the client device, according to S606. The returned structured address is utilized to populate each field of the structured address form, as discussed by reference to method 300 above. Of course, while FIG. 6 discloses a method done using client-server architecture, the method can equally be done entirely on the client device.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 7:
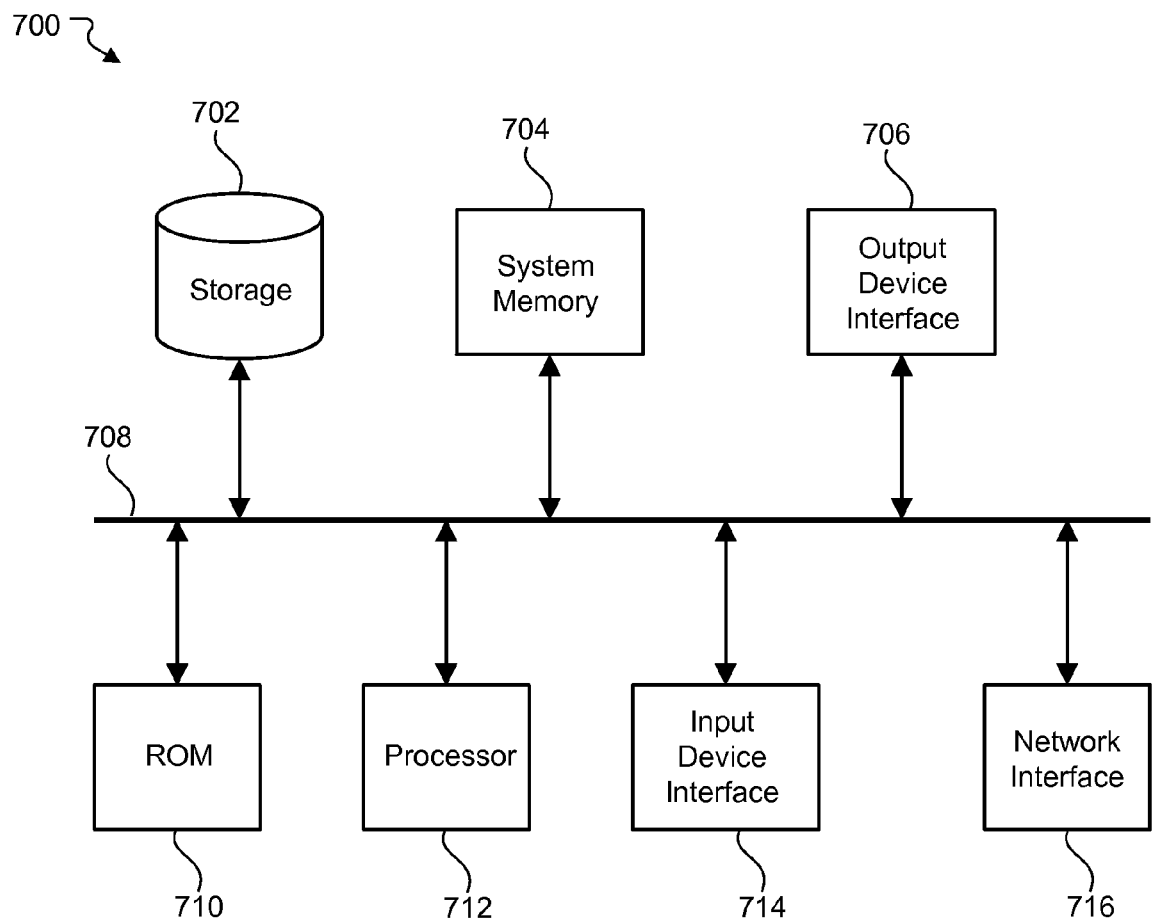
FIG. 7 conceptually illustrates an example electronic system with which some implementations of the subject technology are implemented.

FIG. 7 conceptually illustrates an example electronic system with which some implementations of the subject technology are implemented. Electronic system 700 can be a computer, phone, PDA, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for obtaining a structured address form from unstructured address information in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interface 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer.

These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method of populating an electronic form, the method comprising:
    detecting a command for pasting a string of unstructured data into one of a plurality of fields of a structured address form;
    geocoding the string of unstructured data to obtain a geolocation;
    reverse-geocoding the obtained geolocation to obtain structured address data; and
    populating, using a processor, each of the plurality of fields of the structured address form with a corresponding field from the obtained structured address data.

2. The method of claim 1, wherein geocoding the string of unstructured data to obtain the geolocation and reverse-geocoding the obtained geolocation to obtain structured address data further comprises:
    sending the string of unstructured data to a server in a request for the server to geocode the unstructured data to the geolocation, reverse-geocode the geolocation to obtain the structured address data, and return the structured address data; and
    receiving the structured address data from the server.

3. The method of claim 1, wherein the string of unstructured data includes address information, and wherein geocoding to obtain the geolocation comprises determining longitude and latitude coordinates corresponding to the address information of the string of unstructured data.

4. The method of claim 3, wherein reverse-geocoding the obtained geolocation to obtain structured address data comprises obtaining the structured address data based on the determined longitude and latitude coordinates corresponding to the address information of the string of unstructured data.

5. The method of claim 1, further comprising:
 determining that the string of unstructured data is geocoded to a plurality of geolocations;
 receiving user location information; and
 using the user location information to determine the geolocation from the plurality of geolocations.

6. The method of claim 1, further comprising determining that the electronic form is a structured address form.

7. The method of claim 6, wherein determining that the electronic form is a structured address form further comprises:
 identifying a label associated with a field of the electronic form; and
 determining that the label is for an address field.

8. The method of claim 7, wherein the address field is a street name, a street number, a city name, a state name, a zip code, or a country name.

9. A machine-readable medium comprising instructions stored therein, which when executed by a system, cause the system to perform operations comprising:
 identifying a structured address form in an electronic document based on labels associated with each of a plurality of input fields of a form on the electronic document;
 identifying a command to paste unstructured data from a clipboard into one of the plurality of input fields of the structured address form;
 sending the unstructured data to a geocoder/reverse-geocoder pair, wherein the geocoder converts the unstructured data into a geolocation and the reverse-geocoder converts the geolocation into a structured address; and
 populating each of the plurality of input fields of the structured address form with data from a corresponding field of the structured address.

10. The machine-readable medium of claim 9, wherein the unstructured data includes address information, and wherein converting the unstructured data to the geolocation comprises determining longitude and latitude coordinates corresponding to the address information.

11. The machine-readable medium of claim 10, wherein the reverse-geocoder converts the determined longitude and latitude coordinates corresponding to the address information into the structured address.

12. A system for populating an electronic form, the system comprising:
 one or more processors; and
 a machine-readable medium comprising instructions stored therein, which when executed by the processors, cause the processors to perform operations comprising:
  receiving unstructured data from a client device;
  geocoding the received unstructured data to obtain a geolocation;
  reverse-geocoding the obtained geolocation to obtain structured address data corresponding to the received unstructured data; and
  returning the obtained structured address data to the client device for population of a plurality of fields of a structured address form.

13. The system of claim 12, wherein geocoding the unstructured data to obtain a geolocation further comprises:
 determining that the unstructured data is geocoded to a plurality of geolocations;
 receiving user location information from the client device; and
 using the user location information to determine the geolocation from the plurality of geolocations.

14. The system of claim 12, wherein the unstructured data corresponds to data being pasted from a clipboard of the client device into one of a plurality of input fields of a structured address form.

* * * * *